Figure 1:
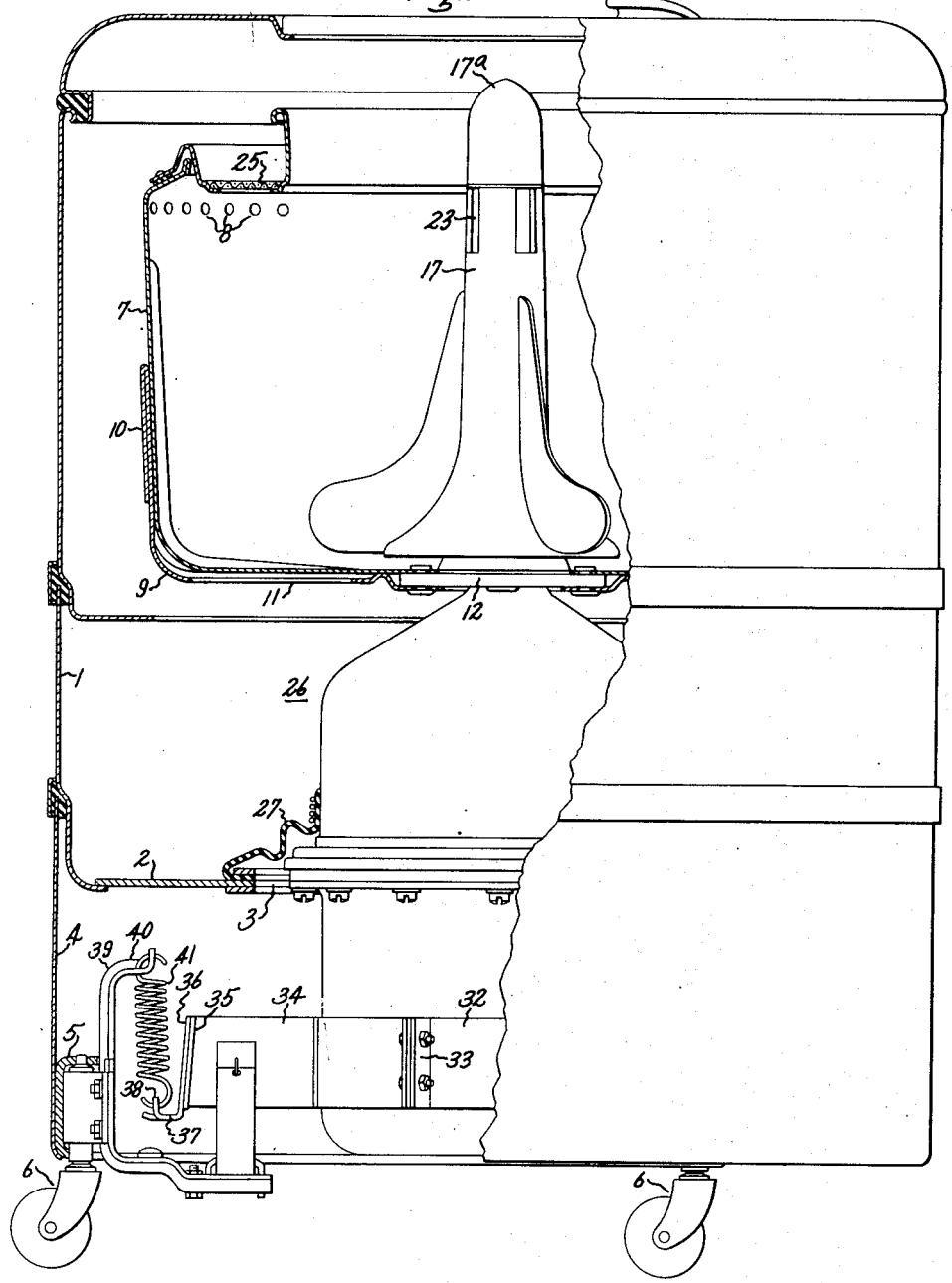

Nov. 3, 1953 T. T. WOODSON 2,657,783
DRIVE MECHANISM FOR WASHING MACHINES AND THE LIKE
Filed Nov. 18, 1950 3 Sheets-Sheet 1

Inventor:
Thomas T. Woodson,
by *Sheridan & Bro's*
His Attorney.

Nov. 3, 1953    T. T. WOODSON    2,657,783
DRIVE MECHANISM FOR WASHING MACHINES AND THE LIKE
Filed Nov. 18, 1950    3 Sheets-Sheet 2
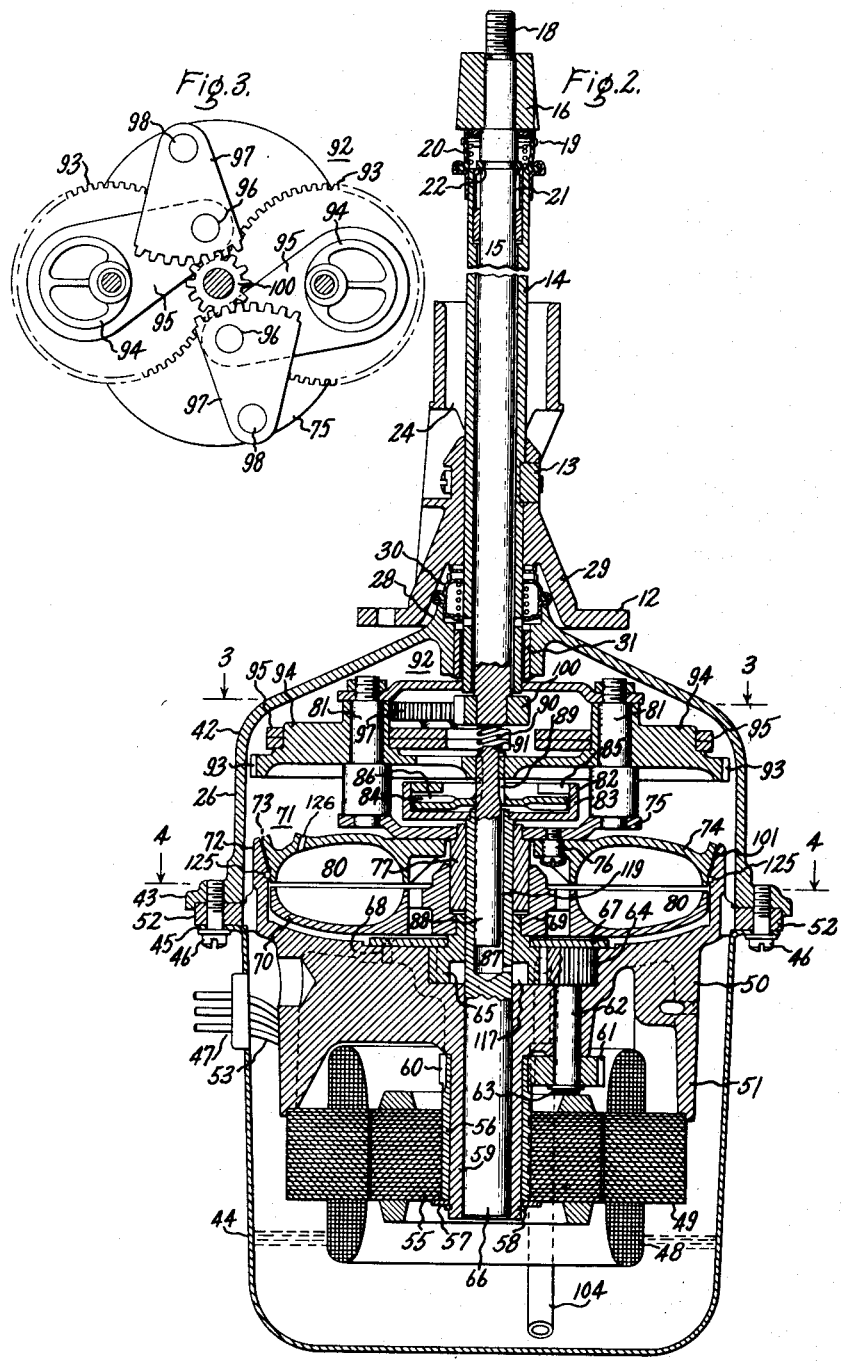
Inventor:
Thomas T. Woodson,
by his Attorney.

Nov. 3, 1953　　　T. T. WOODSON　　　2,657,783
DRIVE MECHANISM FOR WASHING MACHINES AND THE LIKE
Filed Nov. 18, 1950　　　3 Sheets-Sheet 3
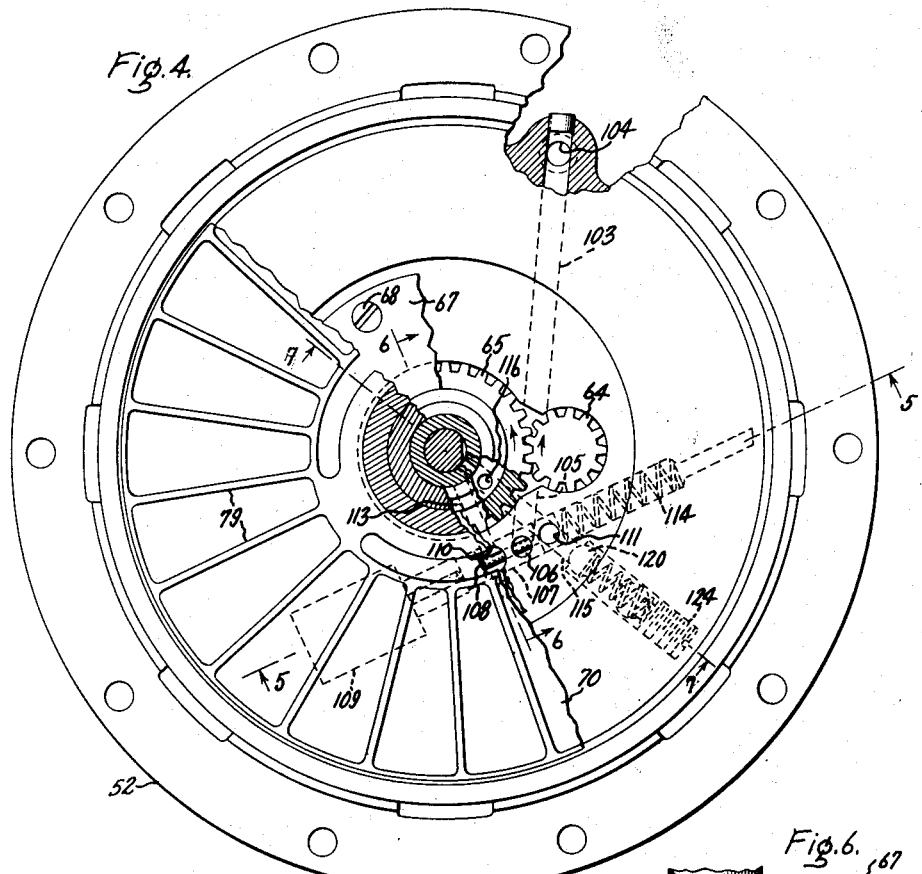
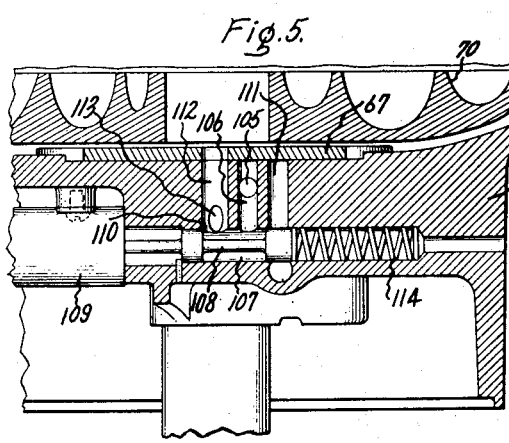
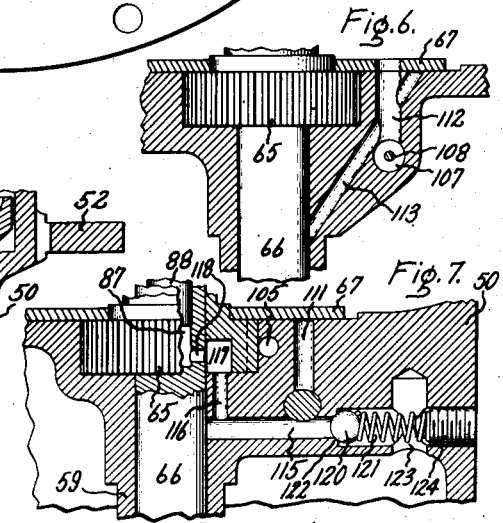
Inventor:
Thomas T. Woodson,
by *[signature]*
His Attorney.

Patented Nov. 3, 1953

2,657,783

UNITED STATES PATENT OFFICE 2,657,783

DRIVE MECHANISM FOR WASHING
MACHINES AND THE LIKE

Thomas T. Woodson, Bridgeport, Conn., assignor
to General Electric Company, a corporation of
New York Application November 18, 1950, Serial No. 196,487

14 Claims. (Cl. 192—3.5)

1

The present invention relates to clothes washing and drying machines, of the type comprising a basket in which the clothes may be washed and which may be rotated for extracting the liquid from the clothes by centrifugal force, and particularly to such machines wherein the driving motor is selectively connected to the washing and extracting mechanisms by fluid actuated clutches.

One object of my invention is to provide in a washing machine of this type an improved construction and arrangement of fluid actuated clutches.

A more specific object of my invention is to provide an improved arrangement for connecting the motor for selective driving of the washing and extracting mechanisms.

Another object of my invention is to provide an improved clutch arrangement wherein the rotatable structure is floated on oil before rotation of the spin basket is begun, thereby minimizing the torque required to break away these parts from standstill.

A further object of my invention is to provide an improved clutch arrangement wherein the driving motor may be started under light load conditions.

In carrying out my invention I provide a pair of co-acting clutch elements for connecting the motor shaft to the agitator shaft and a second pair of co-acting clutch elements for connecting the motor shaft to the spin shaft. For engaging these respective clutch elements I provide a fluid pressure generating system including an oil pump, which may be operated by the drive motor, and a control valve, for supplying lubricating oil to the bearings and selectively delivering oil under pressure to the agitate and spin clutches. In one position of the control valve oil is supplied to the agitate clutch to exert a pressure directly on one element to move it into driving engagement with its mating element. Since the motor reaches a speed approximating its regular running speed before enough oil is delivered by the motor operated pump to build up a sufficient pressure to cause engagement of the agitator clutch element, it is substantially unloaded when started, making the use of a starting capacitor unnecessary. In the other position of the control valve oil is supplied to the spin clutch or coupling. The driven spin clutch element is arranged to support the entire rotatable structure of the water extraction operation and is biased by the weight of this rotatable structure into engagement with a restraining brake element. Ordinarily, a high breakaway torque must be provided to start rotation of the spin basket, but in my invention the oil supplied to the spin coupling exerts a force on the driven element moving it off the brake element and provides a flow of oil between the brake faces while supporting the driven clutch element and the entire rotatable structure carried by it. Since the rotatable structure is floated on oil prior to the commencement of the spin operation, the required breakaway torque is therefore materially reduced. In the preferred embodiment of my invention a fluid coupling is used as the spin clutch and the oil supplied to float the driven member is also used to furnish the driving medium between the coupling members.

For a consideration of what I believe to be novel and my invention, attention is directed to the following specification and the claims appended thereto.

In the accompanying drawings, Fig. 1 is a sectional elevation of a washing machine embodying my invention; Fig. 2 is an enlarged sectional elevation of the driving mechanism; Fig. 3 is a section on line 3—3 of Fig. 2; Fig. 4 is an enlarged section on line 4—4 of Fig. 2; Fig. 5 is a section on line 5—5 of Fig. 4; Fig. 6 is a section on line 6—6 of Fig. 4; and Fig. 7 is a section on line 7—7 of Fig. 4.

Referring to Figs. 1 and 2 of the drawing, I have shown my invention as applied to a washing machine of the type disclosed in my previous application, Serial No. 551,096, filed August 25, 1944, now Patent 2,527,238, assigned to the same assignee as my present application. As there shown, I provide an outer casing or tub 1 of a suitable construction having a bottom wall 2 provided with a central opening 3. The tub is supported on a skirt 4, the lower end of which is fixed to an annular channel arm 5 which in turn is supported on suitable casters 6. In the upper part of the tub 1 is located a spin basket 7 having centrifugal discharge openings 8 at the region of greatest diameter which during washing are at or slightly above the liquid level. The spin basket is nonrotatably seated in a carrier 9 having an annular wall 10 serving as a balance ring and having radial arms 11 bolted to a hub 12 fixed by a clamp 13 (Fig. 2) to a tubular shaft or sleeve 14 provided for supporting and driving the basket.

Journaled in the tubular shaft or sleeve 14 is a shaft 15 extending the length thereof and projecting upwardly therefrom. On the upper end of shaft 15 is a pyramidal nut 16 on which is mounted, in driven engagement therewith, a bladed agitator 17. A cap 17a screws on the threaded extension 18 of the agitator shaft 15 to keep the agitator from moving upwardly relative to the shaft during washing. On the upper end of the sleeve 14 is provided a suitable seal 19 biased to sealing position by a spring 20. Within the sleeve 14 at its upper end is a suitable bearing 21 which cooperates with a thrust washer 22 on the agitate shaft 15 to guide and support the agitate shaft.

In the agitator at or slightly below the wash water level in the spinner basket are drain passages 23 leading to the space between the spin shaft 14 and an upper extension of the spin basket supporting hub 12. The water draining through these passages flows through passages 24 in the upper extension of the hub 12 to the bottom wall 2 of the tub 1 from where it is pumped through a filter 25 on the rim of the spin basket by a circulating pump (not shown). The continuous circulation and filtering of the water removes lint and other particles and keeps the wash water cleaner.

The concentric spin and agitate drive shafts 14 and 15 are driven by mechanism enclosed within a sealed casing 26 having its upper end projecting through opening 3 in the bottom wall 2 of the outer casing 1. The space between the casing 26 and the wall 2 is sealed by a flexible annular rubber ring 27 having its inner end clamped to the casing 26 and its outer edge clamped to the wall 2. The ring 27 serves not only as a seal but as a flexible connection preventing the transmission of vibrations to the outer casing. The upper end of the casing 26 which is above the maximum water level in the outer casing 1, is provided with a reduced diameter hub 28 projecting within a skirt 29 formed on the spin basket hub 12, and is provided with a seal 30 and a sleeve bearing 31 for the spin shaft 14.

I support the drive casing in the manner disclosed in my Patent 2,454,112, November 16, 1948, assigned to the same assignee as my present application. For this purpose, a ring 32 is clamped to the lower end of the casing 26, the ends of which ring may be fastened together as indicated at 33 firmly to attach the ring to the casing. Carried by the ring are a plurality of radially projecting arms 34. At their outer ends, each arm is provided with the flange 35 to which is fixed a plate 36 on the lower end of which is a foot 37 and a pair of spaced upwardly turned ears 38, provided with openings, not shown. Fixed to channel arm 5 in radial alignment with each arm 34 is a bracket 39 having a head 40 at its upper end in which are openings and notches, not shown, in line with openings in the upwardly turned ears 38. I provide a pair of springs 41, the ends of which are attached through the openings at heads 40 and ears 38, for supporting each arm 34 to provide a resilient suspension for the drive unit.

The casing 26 is formed of an upper shell 42, with an annular flange 43 at its lower end, and a lower shell 44, with an annular flange 45 at its upper end. The shells 42 and 44 are secured together by a plurality of screws 46 passing through their respective flanges to form a substantially closed casing for the driving mechanism. A suitable electrical plug 47 is provided in the side of the lower shell 44. The driving mechanism within the casing includes a motor 48 with a stator 49 secured to a supporting casting 50 by screws not shown, passing upwardly through the stator and threaded into ribs, not shown, formed on the inner surface of a depending skirt 51 on the casting 50. The supporting casting 50 is provided with an annular flange 52 shown secured between flanges 43 and 45 on the upper and lower halves of the casing by the screws 46, though it should be understood that any suitable means of securing these flanges together, such as by welding, may be used. The motor winding is electrically connected to the plug 47 by leads 53. The motor further includes a rotor 55 fixed to a sleeve 56 the lower end of which is supported by a thrust bearing 57 held in place by a clamping ring 58 on the outer surface of a tubular shaft 59 extending downwardly from casting 50 and integral therewith.

Since the running speed of motors commonly used with clothes washers is greater than that desired for the spinning and agitating mechanisms I provide a speed reduction arrangement including a gear 60 cut into the upper end of the sleeve 56 and engageable with a gear 61 pressed on a shaft 62 and locked in by snap ring 63. The shaft 62 is journaled in a vertically disposed cylindrical opening in the casting 50 and has formed on its upper end an integral gear 64, positioned within a cavity in the upper portion of casting 50 in engagement with a gear 65 of about twice its number of teeth. The gear 65 is carried on and drives a shaft 66 which is journaled within the tubular shaft 59 of the casting 50. A flat plate 67 which may be circular fixed to the casting 50 by a plurality of screws 68 is provided to form in conjunction with the cavity in the upper portion of the casting 50 a close-fitting housing for gears 64 and 65.

Integral with the gear 65 I provide a hub 69 extending upwardly through an opening in the plate 67, on which hub I non-rotatably mount the driving disk 70 of a kinetic type fluid clutch or coupling 71. Of course, my invention is not limited to the case where a fluid drive connection is used but clearly includes a friction or other suitable clutch. I provide a housing for the fluid coupling defined by an annular wall or rim 72 extending upwardly from the upper surface of the casting 50 and concentrically aligned with the shaft 66, the upper surface 73 of the rim being outwardly inclined from the vertical. The fluid coupling 71 includes a driven disk 74 attached, in spaced apart relation with the driving disk 70, to a substantially flat circular plate 75 to which it is fixed by screws 76. The plate 75 is carried on a sleeve 77 rotatably journaled on the shaft 66. An axial hub is provided on the driving disk 70 in which a cylindrical recess is formed to receive the lower end of the sleeve 77 to align and guide the disk 70. Both disks 70 and 74 are formed with annular recesses near their peripheries, which recesses are divided into sections by a plurality of spaced ribs 79 (Fig. 4) in accordance with conventional fluid coupling practice. The annular recess of disk 70 and the annular recess of disk 74 together define a fluid receiving toroidal cavity 80.

As support for the agitator gear mechanism I provide a pair of shafts 81 fixed to and extending upwardly from the plate 75 and in polar symmetry around the center of rotation of the plate, so that upon rotation of the driven disk 74, the shafts 81 will revolve in an annular orbit around the shaft 66. On the upper end of the shaft 66 is a clutch 82 comprising a driving member 83 directly engageable with a driven member 84. Positive driving connection is provided by a plurality of slots 85 on the driving member positioned for receiving raised fingers 86 on the driven member when the members are moved together into clutch engaging position. I do not mean to limit my invention to a case where a positively engaging clutch is used for this connection as it obviously includes the use of a friction, hydraulic, or other well known clutch. As shown in Fig. 2 the driving member 83 is shaped to form a housing positioned to enclose the driven member 84, forming therewith a chamber. This chamber is enlarged whenever the driven member is moved upwardly, in a manner explained hereinafter, to its engaged position with the driving member.

The upper portion of the shaft 66 is concentrically bored to form a cylindrical chamber 87 in which is journaled a shaft 88 extending above the upper end of shaft 66 on which a pinion 89 is formed at its upper end. Carried on and fixed to the shaft 88 is the clutch driven member 84 which is biased downwardly to its disengaged position by a coil spring 90 positioned between the lower end of agitator shaft 15 and the pinion 89 and held in place by an upwardly extending stub shaft 91 carried on the pinion. The clutch member 84 when engaged with the driving member 83, in a manner more fully explained hereinafter, drives an agitator mechanism 92. The mechanism 92 comprises a pair of gears 93 in engagement with the pinion 89 and rotatably mounted on the shafts 81. Integrally formed with each gear 93 is an upwardly extending cylindrical portion 94 the center of which is eccentrically located with respect to its shaft 81 and which serve as a pair of eccentric stub shafts on each of which is rotatably mounted a link 95 as best seen in Fig. 3. The ends of the links 95 are pivotally connected respectively at 96 with sector gears 97 which are pivotally mounted at their centers on shafts 98 (Fig. 3) similar to shafts 81, but not shown on the sectional elevation of Fig. 2. The sector gears 97 both engage a pinion 100 which is fixed on the lower end of the agitator shaft 15. Consequently when the agitator clutch is engaged, pinion 89 on shaft 88 drives gears 93 which drive the links 95. The links 95 serve as connecting rods between the hubs 94 and the sector gears 97 to transmit the crank motion of the hubs to the sector gears to cause them to oscillate. This oscillatory motion is transmitted by the sector gears to gear 100 on the agitate shaft 15 to impart the desired washing motion to the bladed agitator 17.

During the agitation period the driving disk 70 of the fluid coupling 71 is idly rotated at the same speed as the shafts 88 and 66. The driven disk 74 of the fluid coupling, although mounted on the floating sleeve bearing 77, is held from rotation by a gravity biased brake comprising a non-metallic brake lining 101 carried on the outer face of the rim 73 of the driven disk 74 and a mating brake surface 72 previously defined as a rim on the casting 50. The brake surfaces are inclined at such a small angle from a vertical that a small biasing force is sufficient to give a large braking torque. The weight of the spin basket, water, clothes, and agitator mechanism provides the gravity biasing force for applying the brakes. Since the plate 75 carrying the shafts 81 is directly connected to the driven disk 74 of the fluid transmission, during agitation, shafts 81 remain stationary, the brake being engaged, and the agitator gearing 92, as a unit, does not rotate. When the brake is disengaged at the completion of the washing cycle, in a manner explained hereinafter, the agitator-gearing, however, will be rotated as a unit at the same speed as the driven disk 74 of the fluid transmission.

The speed reduction gears 64 and 65 together with the housing formed by the cavity in the upper part of casting 50 and the cover plate 67 constitute a gear pump as best seen in Figs. 2 and 4. Connected to the inlet side of the gear pump is a passage 103 in the casting 50. The passage 103 connects with a tube 104 dipping into a reservoir of oil in the bottom of the drive casing 26 suitable for lubrication of the moving parts of the mechanism and in addition for use as the hydraulic medium for the fluid transmission. The pump discharges through a passage 105 into another passage 106 (Fig. 5), just beneath the cover plate 67, leading to a main control passage 107. A slide valve 108 provided in the passage 107 is operated by a suitable solenoid indicated at 109 and controls the selective opening of a pair of ports 110 and 111 provided in the wall of the passage. In the position shown in Fig. 5, port 111 is closed and port 110 is open to the passage 107. The port 110 is the entrance of an upwardly extending passage 112 leading to the cavity beneath the driving disk 70 of the fluid coupling. A passage 113 is provided connected to the passage 112 to provide lubrication for the shaft 66 (Fig. 6). A spring 114 positioned between the free end of the slide valve 108 and the casting 50 is provided to bias the slide valve to the position shown in Fig. 5. When the solenoid is energized the slide valve is moved against the bias of the spring 114 to close port 110 and to open port 111 to the passage 107. In this position oil from the gear pump will enter port 111 and move along a horizontal passage 115 in the casting 50 (Fig. 7) and then upwardly along a small passage 116 into a cavity 117 formed by a recess in the underside of the gear 65. Since the passage 115 communicates with the inner surface of the cylindrical hub 59 of the casting 50, oil is furnished to shaft 66 for lubrication. A small opening 118, provided in the shaft 66, communicates between the cavity 117 and the chamber 87 (Fig. 2) formed in the upper part of the shaft 66, so that oil from the pump is forced into the chamber 87. The floating shaft 88 journaled in the chamber 87 is provided with a flattened side to form a passage 119 with the inner wall of the shaft 66, leading to the chamber below the clutch plate 84.

Referring again to Fig. 7 there is provided an oil pressure relief arrangement including a spherical valve 120 biased by a spring 121 to its closed position against a seat 122 formed in the open end of oil passage 115. When the oil pressure exceeds the bias, oil is bypassed through passage 123 into the space beneath the casting 50 from where it returns to the reservoir in the bottom of the drive casing 26. The pressure maintained in the passage 115, which is substantially the pressure available under the clutch member 84, may be controlled by a set screw 124 provided for adjusting the spring force against the valve 120.

In the operation of the machine, when the wash cycle begins the motor is started and the solenoid 109 is energized to move the slide valve 108 to the right as seen in Fig. 5, uncovering port 111. These operations may be controlled by a conventional program selector switch which is old and well known in the clothes washer art and has not been illustrated. At the start the motor has no load other than the oil pump, thus avoiding a high starting torque. A few seconds after the motor starts oil pressure builds up in passages 107 and 115, in cavity 117, in passage 118, in cavity 87, in passage 119, and in the chamber below the clutch member 84. This pressure moves the member 84 upwardly against the bias of spring 90 to positively engage the clutch 82, which is rotatably driven by the shaft 66, and continuing pressure keeps the clutch engaged. Although the gear 65 is attached to and drives the disk 70 of the fluid coupling as well as the shaft 66, this disk rotates idly as there is no fluid in the cavity 80. The driven disk 74 of the fluid coupling is firmly held by the brake arrangement previously described. The agitator clutch member 84 drives shaft 88, which through the agitator gearing 92, causes oscillation of the agitate shaft 15.

At the beginning of a spin cycle for extracting water from the clothes the motor continues to run and the solenoid 109 is deenergized. The slide valve 108 is moved by the spring 114 to its position shown in Fig. 5, closing port 111 and opening port 110. This relieves the oil pressure under the clutch member 84 and the spring 90 moves it to disengaged position. The fit between the clutch drive member 84 and the enclosing housing formed by the driven member 83 is loose enough to permit venting of the space below the drive member to discharge to the atmosphere the liquid contained therein when the drive member is moved downwardly under the force of its biasing spring. Of course, this fit is sufficiently tight to permit the fluid pressure to build up in the clutch chamber when the pump discharge is directed to it in spite of leakage around the edges of the driving plate. The oil pressure begins building up in passage 112 and in the cavity defined by the rim 72 and the casting 50. This causes the cavity 80 of the fluid coupling to fill with oil, at which time the rotating disk 70 would begin to drive the disk 74 except for the engagement of the brake surfaces 101 and 72. As pressure in the cavity 80 becomes sufficient to overcome the gravity bias the disk 74 is lifted a small distance to disengage the brake surfaces 101 and 72. Sufficient pressure to keep the brake disengaged is assured by the use of a pump of proper capacity, but if desired there may be provided a flow limiting annular recess 125 on the inner surface of the rim 72 just below the brake surface 101, which recess forms with the oil a hydrodynamic seal in a well known manner. This seal further assures maintenance of the proper oil pressure. The movement of brake surface 72 away from brake surface 101 need be only very slight to effect dis-engagement. Consequently, when the driven disk of the fluid coupling has been raised until the peripheral gap is sufficient to drain the oil supplied by the pump, it is freely floating on oil. This oil carries the thrust of the agitator and agitator mechanism, spin basket, water and clothes load, minimizing the torque required to break away from standstill the parts to be rotated.

When the solenoid 109 is again energized to begin another wash cycle the oil supply to the fluid coupling 71 is cut off so that brake releasing pressure will not be maintained in the cavity 80. To assure that the pressure in this cavity is relieved promptly I provide a small aperture 126 in the driven disk 74 of sufficient diameter to permit oil leakage from the cavity 80 from where it returns by gravity to the oil reservoir in the bottom of the casing 26. The aperture 126 is not large enough, however, to prevent the building up of brake releasing pressure in the cavity when the oil supply from the gear pump is directed by the slide valve 108 to the fluid coupling.

While I have shown a particular embodiment of my invention it will be understood, of course, that I do not wish to be limited thereto since many modifications may be made; and I therefore contemplate by the appended claims to cover any such modifications as fall within the true spirit and scope of my invention.

What I claim as new and desire to secure by Letters Patent of the United States is:

1. In a clothes washing and extracting machine, a mechanism for driving a rotatable clothes basket comprising, a motor, a first shaft driven by said motor, a second shaft connected to and supporting said basket, a coupling for said first and second shafts comprising a driving disk connected to said first shaft and a driven disk connected to and supporting said second shaft and clothes basket, a housing below and partly enclosing said coupling, brake means on said housing on which said driven disk rests and which form the sole support for said second shaft and basket, and fluid pressure generating means for supplying liquid under pressure directly to said coupling disks to effect engagement of said disks and simultaneously to exert a force on said driven disk to lift it off said brake and support it and said shaft and basket on said liquid during a spin operation.

2. In a clothes washing and extracting machine, a motor, a drive shaft connected to said motor, a fluid coupling comprising a recessed bladed driving disk fixed to said drive shaft and a recessed bladed driven disk in spaced relation from said driving disk and forming a peripheral fluid receiving cavity therewith, a housing enclosing the lower part of said coupling, a driven shaft connected to said driven disk, brake means on said housing, a brake surface on said driven disk which rests on said brake means, said brake means forming the sole support for said driven disk and driven shaft, and a fluid pressure generating system to supply liquid under pressure to fill said peripheral cavity of said fluid coupling and substantially simultaneously to move said driven disk to disengage its brake surface from said brake means and support the driven disk and driven shaft on said liquid.

3. In a clothes washing and extracting machine, a unitary driving mechanism comprising a sealed casing, a motor, a motor shaft, a spin coupling of the fluid drive type comprising a recessed bladed driving disk fixed to said drive shaft and a bladed driven disk in spaced relation from said driving disk and forming a peripheral cavity therewith, a housing beneath and partly enclosing said coupling, a second shaft connected to and supported by said driven disk, a rotatable clothes basket carried on said second shaft, brake means for said driven disk comprising a first brake surface on the periphery thereof engageable with a second brake surface on said housing, said second brake surface forming the sole support for said driven disk, second shaft and clothes basket, and oil pressure generating means including a pump driven by said motor, means for supplying oil to said pump, and valve means operable to direct the oil discharged from said pump into a passageway leading to said housing to supply oil under pressure to fill said fluid coupling cavity and simultaneously to exert a pressure on said driven disk to move it upwardly in opposition to said biasing means for disengaging said brake means and floating said driven disk and the second shaft and clothes basket on said oil.

4. A unitary driving mechanism comprising a motor, a motor shaft, a drive shaft, gear reduction means connecting said motor shaft and said drive shaft, a housing for said gear reduction means forming therewith a gear pump, a driven shaft, a coupling for said drive shaft and said driven shaft comprising a driving member and a driven member, a housing for said coupling, a brake carried by said housing and engageable with said driven member, means biasing said driven member into brake engaging position, and an oil pressure generating system operated by said motor and including said gear pump for supplying oil under pressure to said coupling members to effect a driving connection between said members and simultaneously to exert a pressure on said driven member to lift it off said brake and support it on said oil.

5. A driving mechanism comprising a motor, a motor shaft, a drive shaft, gear reduction means connecting said motor shaft and said drive shaft, a driven shaft, a fluid coupling connection between said drive shaft and said driven shaft, a housing for said gear reduction means forming therewith a gear pump, and fluid pressure generating means including said gear pump for supplying the liquid driving medium to said coupling.

6. In a clothes washing machine, a driven member, a motor for driving said member, a clutch for effecting a driving connection between said motor and said member comprising a first clutch element driven by said motor and a second clutch element connected to said driven member, a brake, a surface on said second clutch element which rests on said brake to prevent rotation of said element, said brake forming the sole support for said driven member, and a fluid pressure generating system operable during rotation of said motor and including means for providing fluid under pressure directly to said elements to effect a driving connection between said elements and simultaneously to exert a pressure on said second element to raise it off said brake and to support it and said driven member on said fluid.

7. In a clothes washing and extracting machine, a unitary structure for selectively actuating an agitator and a spin shaft comprising a substantially sealed casing, a frame within said casing, a motor, a drive shaft driven by said motor, an agitator clutch comprising a driving member connected to said drive shaft and a driven member engageable with said driving member, an agitator shaft carried by said driven member, biasing means biasing said clutch members out of engagement, a fluid coupling comprising a bladed driving disk fixed to said drive shaft and a bladed driven disk in spaced relation from the driving disk to form a peripheral cavity therewith, a spin shaft connected to said driven disk, a brake for said driven disk comprising a first brake surface on the periphery thereof and a second brake surface on said frame, biasing means biasing said brake members into engagement, fluid pressure generating means including a pump driven by said motor, passageways leading from said pressure generating means to the agitator clutch and the spin coupling respectively, and valve means for selectively directing the liquid discharged from said pump into said passageways thereby in one position of said valve means to supply liquid under pressure directly to said agitator clutch for moving said clutch members into engagement in opposition to said clutch biasing means and in another position supplying liquid under pressure directly to said fluid coupling to move said fluid coupling driven disk in opposition to said brake biasing means to disengage said brake means and support said driven disk and simultaneously to fill said fluid coupling cavity.

8. In a clothes washing and extracting machine, a unitary structure for selectively actuating an agitator and a spin shaft comprising a sealed casing, a frame within and fixed to said casing, a motor within said casing, a drive shaft driven by said motor, an agitator clutch comprising a driving member connected to said shaft and forming a housing, a driven member engageable with said driving member, said agitator clutch housing substantially enclosing said drive member, an agitator shaft carried by said driven member, biasing means biasing said clutch members out of engagement, a spin coupling of the fluid drive type comprising a bladed driving disk fixed to said drive shaft and a separate bladed driven disk in spaced relation from said driving disk to form a peripheral cavity therewith, a housing on said frame below and partly enclosing said spin coupling, a spin shaft connected to and supported by said driven disk, a brake for said driven disk comprising a first brake surface on the periphery thereof and a second brake surface on said spin coupling housing, gravity biasing means including said spin shaft to bias said brake surfaces into engagement, oil pressure generating means including a pump driven by said motor, and valve means for selectively directing the oil discharged from said pump into passageways leading to the agitator clutch and the spin coupling respectively thereby in one position of said valve means supplying oil under pressure directly to said agitator clutch housing for moving said clutch in opposition to said biasing means into engagement with said driving member, and in another position supplying oil under pressure directly to said driven disk of said spin coupling for lifting said fluid coupling driven disk off said brake to disengage said brake and simultaneously to provide the oil to fill said spin coupling cavity and to support the thrust of said spin coupling driven disk.

9. In a clothes washing and extracting machine, a unitary structure for selectively actuating an agitator and a spin shaft comprising a sealed casing, a frame within and fixed to said casing, a motor within the casing, a drive shaft driven by said motor, an agitator clutch comprising a driving member connected to said shaft and forming a housing, a driven member engageable with said driving member and forming a cavity with said driving member, an agitator drive shaft carried by said driven member, biasing means biasing said clutch members out of engagement, a spin coupling of the fluid drive type comprising a bladed driving disk fixed to said drive shaft and a separate bladed driven disk in spaced relation from the driving disk so as to form a peripheral cavity therewith and drivingly engageable therewith upon admission of fluid to said cavity, a housing on said frame below and enclosing said driving disk and forming a cavity therewith below said driving disk, said spin coupling housing extending upwardly to form a rim having a contiguous annular surface with the periphery of said driven disk, a spin shaft connected to said driven disk, a brake for said driven disk comprising a first brake surface on the periphery thereof engageable with a second brake surface on said frame, biasing means biasing said brake members into engagement, a pump driven by said motor, a supply of fluid for said pump, and valve means for selectively directing the liquid discharged from said pump into passageways leading to the agitator clutch and the spin coupling respectively thereby in one position of said valve means supplying fluid pressure for moving said agitator clutch members into engagement in opposition to said clutch biasing means and in another position supplying fluid pressure for moving said fluid coupling driven disk in opposition to said brake biasing means to disengage said brake means and to provide the driving medium for said fluid coupling.

10. In a clothes washing and extracting machine, a unitary structure for selectively actuating an agitator and a spin shaft comprising a motor, a drive shaft driven by said motor, an agitator clutch comprising a driving member connected to said shaft and a driven member engageable with said driving member, an agitator shaft carried by said driven member, biasing means biasing said clutch members out of engagement, a spin clutch comprising a driving disk on said drive shaft and a driven disk, a spin shaft connected to said driven disk, a housing below and partly enclosing said spin clutch, brake means engageable with said driven disk, biasing means biasing said driven disk into brake engaging position, a fluid pressure generating system comprising a pump driven by said motor, and valve means for selectively directing the liquid discharge from said pump into passageways leading to said agitator clutch and said spin clutch respectively thereby in one position of said valve means supplying liquid under pressure directly to said agitator clutch for moving said clutch members into engagement and in another position supplying liquid under pressure directly to said spin clutch to effect a driving connection between said spin clutch disks and simultaneously to exert a pressure on said driven disk to move said driven disk in opposition to said biasing means to disengage said brake means.

11. In a clothes washing machine, a drive mechanism for a clothes agitator comprising a motor, a motor shaft, a first shaft driven by said motor shaft, a gear reduction unit connecting said motor shaft and said first shaft, a housing for said gear reduction unit forming therewith a gear pump, a second shaft drivingly connected to said agitator, a clutch for effecting a driving connection between said first and second shafts, said clutch comprising a first element and a second element slidable relative thereto for drivingly engaging said first element, biasing means biasing said first and second clutch elements out of engagement, and a fluid pressure generating system including said gear pump for supplying fluid under pressure to said clutch to exert a pressure directly on said second clutch element to move said second element into engagement with said first element.

12. In a clothes washing and drying machine, a housing having an upwardly facing brake surface thereon, a driven shaft, a spin basket fixed to and carried by said driven shaft, a driven member fixed to said driven shaft having a downwardly facing brake surface which rests on said upwardly facing brake surface, said spin basket, driven shaft and driven member being supported on said upwardly facing brake surface and being movable as a unit upwardly with respect thereto, a driving member, an electric motor for turning the driving member, a fluid pump driven by said motor, means actuated by fluid under pressure from said pump for connecting said driving member to said driven member, and means defining conduits through which fluid pressure is supplied from said pump to said housing to effect upward movement of said driven member to move its downwardly facing brake surface out of engagement with said upwardly facing brake surface and support it out of engagement therewith during a basket spinning operation.

13. In a clothes washing and drying machine, walls which define a housing and an upwardly facing brake surface, a driven shaft, a spin basket fixed to the driven shaft, a driven member fixed to the driven shaft, said driven member being positioned on said housing and having a downwardly facing brake surface which rests on said upwardly facing brake surface, which latter forms a support for said spin basket, driven shaft and driven member, said spin basket, driven shaft and driven member being movable vertically as a unit with respect to said housing, a driving member, an electric motor for turning the driving member, a fluid pump driven by said motor, means actuated by fluid pressure from said pump for connecting said driving member to said driven member, and means defining conduits for supplying fluid pressure from said pump to said housing beneath said driven member for lifting said driven member, driven shaft and spin basket as a unit to separate said brake surfaces and support said driven member, driven shaft and spin basket during a basket spinning operation.

14. In a clothes washing and drying machine, housing walls which define an annular upwardly facing brake seat, a unitary structure comprising a spin shaft, a spin basket and a driven disk, said driven disk having an annular downwardly facing brake surface which rests on said upwardly facing brake surface which latter forms a support for said unitary structure, a driving motor, means for connecting said driving motor to said unitary structure for spinning it, a fluid pump driven by said motor, and walls defining conduit means for supplying fluid pressure from said pump to the underside of said driven disk to effect separation of said brake surfaces and fluid support for said unitary structure during a basket spinning operation.

THOMAS T. WOODSON.

References Cited in the file of this patent

UNITED STATES PATENTS

| Number | Name | Date |
|---|---|---|
| 506,517 | Leibert | Oct. 10, 1893 |
| 975,795 | Radcliffe | Nov. 15, 1910 |
| 2,311,740 | Dodge | Feb. 23, 1943 |
| 2,462,657 | McNairy | Feb. 22, 1949 |
| 2,485,621 | McNairy | Oct. 25, 1949 |
| 2,485,623 | McNairy | Oct. 25, 1949 |
| 2,574,418 | Rubano | Nov. 6, 1951 |
| 2,588,724 | Hobbs et al. | Mar. 11, 1952 |